April 23, 1968   F. BEYER ETAL   3,379,108
EXCHANGEABLE FILM MAGAZINE FOR MICROFILM CAMERAS
Filed March 24, 1965
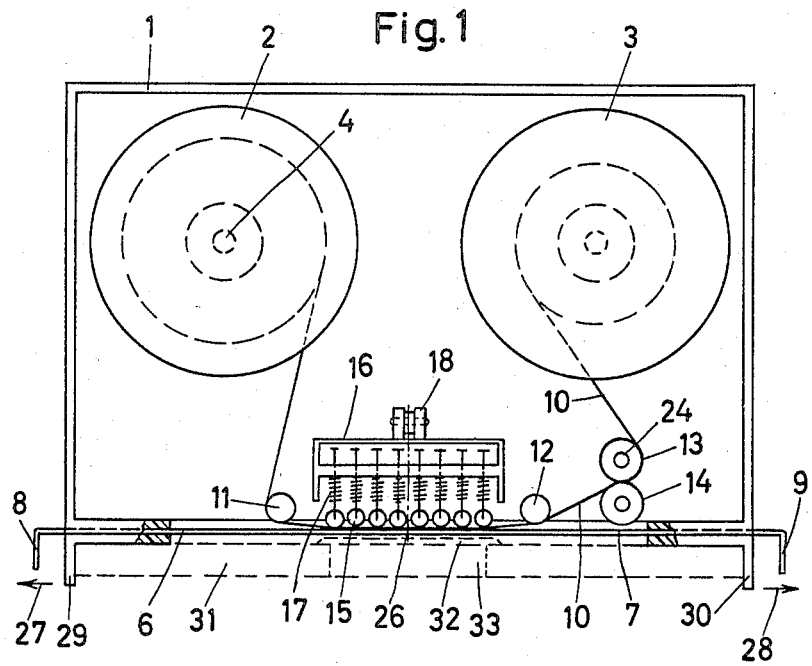
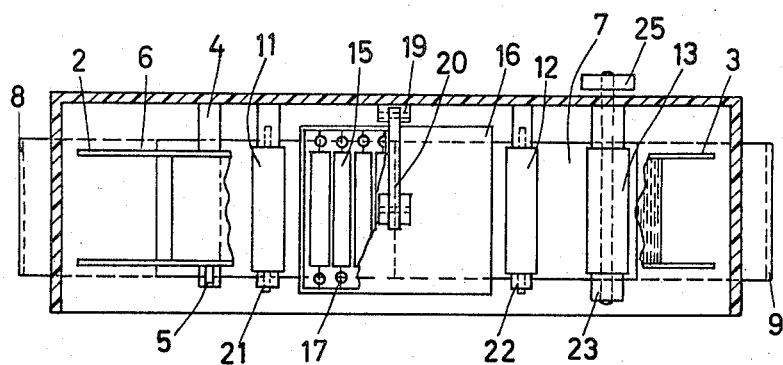
INVENTORS
ALEX JACKNAU
FRITZ BEYER
HERBERT FROESE
WALTER SCHEFFEL
FREDI WOLF
Arthur O. Klein
their Attorney

United States Patent Office 3,379,108
Patented Apr. 23, 1968

3,379,108
EXCHANGEABLE FILM MAGAZINE FOR
MICROFILM CAMERAS
Fritz Beyer, Winsen an der Luhe, Herbert Froese and Alex Jacknau, Berlin, Walter Scheffel, Langenfeld, and Fredi Wolf, Berlin, Germany, assignors, by direct and mesne assignments, to Agfa-Gevaert Aktiengesellschaft Leverkusen, Germany, a corporation of Germany
Filed Mar. 24, 1965, Ser. No. 442,424
Claims priority, application Germany, Apr. 29, 1964,
J 25,742
9 Claims. (Cl. 95—31)

ABSTRACT OF THE DISCLOSURE

An exchangeable film magazine which is adapted to be mounted over the shutter opening of a camera in optical alignment therewith. Two reels for transporting the film are rotatably mounted inside the film magazine. Two slide members which are movable in opposite directions are mounted on the bottom member of the film magazine over an opening in said bottom member. A film pressure mechanism is mounted between the two reels inside the film magazine and presses that portion of the film which is located between the two reels substantially parallel and flatly against the bottom of the film magazine so that this portion projects slightly from the bottom of the film magazine through said opening therein when said two slide members have been moved outwardly to expose said opening.

---

This invention relates generally to film magazines for cameras.

More specifically, this invention relates to an exchangeable film magazine for microfilm cameras. The novel construction of the film magazine of this invention comprises a housing with a reel for the exposed film and another reel for the unexposed film mounted therein; film guide rollers are mounted in the magazine and a slide mechanism is mounted on the magazine.

Many types of film magazines are known in the art. Some known types of film magazines have the unexposed and exposed film mounted therein. In those known types of film magazines two reels are mounted at a distance from each other in the film magazine. The two reels are in communication with each other by means of a bridge member. The bridge member usually has the shape of a flat rectangular tube and is provided with a camera window.

The aforedescribed known type of film magazine is placed in a camera and the film advance takes place as the film moves through said bridge member by turning the reel carrying the exposed film a predetermined amount.

It is further known to provide a camera with two reels, one of which serves to take up the exposed film and the other carries the unexposed film. In these known types of cameras the film is guided in front of a film window and is held flatly against the film window by means of a pressure plate arrangement.

This type of camera presents the disadvantage of the pressure plate arrangement scratching the film when it bears heavily against it. Some of the aforedescribed known cameras include a mechanism which disengages the pressure plate arrangement during the film advance movement. These known types of cameras are provided with gear wheels as friction rollers to advance the film stored in the camera.

All of the aforedescribed cameras and film magazines have the disadvantage in that it is not possible to exchange the film in the camera with another film without considerable film wastage. It is, of course, possible, in most of the known arrangements to rewind the film completely before exchanging it. Such a procedure has, however, been found to be impractical.

In order to avoid exposure of the film during exchange of one film magazine containing unexposed film for another film magazine, it is possible to provide the film magazine with a slide mechanism. Such a slide mechanism arrangement can, in particular, be incorporated into the aforedescribed film magazine with the bridge member. It has been found, however, that such slide mechanism arrangement is technically difficult and costly when it is incorporated into the film magazine with the bridge member. Furthermore, the operation of a slide mechanism, when incorporated in a film magazine of the bridge member type, has been found to be technically difficult in that the slide mechanism frequently malfunctions by failing to provide a light tight closure.

Microfilm cameras are often called upon to reproduce on microfilm printed material, drawings, blueprints and the like, whereby a certain type of informative material is to be reproduced on one microfilm and another type of informative material on another microfilm. Only one unit of such a microfilm camera is often available in a large organization. Each department of the organization requires a special microfilm for making reproductions. In view of this requirement, microfilm cameras which have the microfilm reels mounted directly in the camera are not suitable. In order to overcome this difficulty, several complete microfilm cameras have been provided in the past which can be easily mounted and dismounted on a special construction for taking microfilm photographs. This special construction is generally provided with a table, projection lamp, and an arm arranged on said table which is adjustable upwardly and downwardly. The aforedescribed special construction is difficult to operate because the exchange of microfilm cameras is accompanied with many manual adjustments. The microfilm cameras are relatively heavy and, consequently, difficult to dismount and mount again. Furthermore, the aforedescribed special construction is costly to manufacture.

It is a general object of this invention to provide a microfilm camera which overcomes to a degree all of the aforedescribed disadvantages.

It is a more specific object of this invention to provide an exchangeable microfilm magazine which can be easily removed from a microfilm camera and replaced by an other one.

The film magazine of this invention accomplishes the above enumerated objects and is characterized by having the reels for transporting the film mounted inside the film magazine. Two slide members which are movable in opposite directions are mounted on the bottom member of the film magazine. A film pressure mechanism is mounted between the two reels and presses that portion of the film which is located between the two reels substantially parallel and flatly against the bottom of the film magazine so that this portion projects slightly from the bottom of the film magazine. The film pressure mechanism comprises a plurality of pressure rollers which are independently suspended inside a cage-like supporting member. Each pressure roller is secured against any transverse movement with respect to the microfilm. The cage-like supporting member, together with all the pressure rollers, is mounted on an arm in swivel-like fashion. The arm, in turn, is swivelably mounted on one of the walls of the film magazine. A supporting shaft is integral with the back wall of the film magazine and supports the reel of unexposed film. A second shaft is rotatably supported in the back wall of the film magazine and is provided with a gear wheel at the end exterior with respect to the film magazine. The exposed film is taken up by a second reel mounted on said rotatable shaft.

The aforementioned as well as additional objects, features, and advantages of the present invention will become more clearly apparent from the following detailed description thereof which is to be read with reference to the accompanying drawings, in which:

FIG. 1 illustrates a schematic side elevation of the film magazine forming the invention with one of the side walls removed; and FIG. 2 illustrates a schematic top plan view of the film magazine illustrated in FIG. 1, with the top wall removed and with some parts broken away for sake of clarity.

Referring now specifically to the drawing, there is illustrated in FIGS. 1 and 2 a film magazine wherein a reel 2 for unexposed film and a reel 3 for taking up the exposed film are mounted. The reel 2 is rotatably mounted on a shaft 4 which has a locking member 5 at its free end for preventing the reel 2 from slipping off the shaft 4. Similarly, the reel 3 is rotatably mounted on a shaft and is prevented from slipping off said shaft by means of a locking member (not illustrated).

The bottom of the film magazine is provided with a longitudinal opening which has a width approximately equal to the width of the film. The opening can be selectively closed by means of two slide members 6 and 7 which, are respectively provided with handgrips 8 and 9 at their exterior ends. The unexposed film is rolled up on reel 2 and runs from reel 2 to a guide roller 11, thence along the bottom of the film magazine 1, and thence via a second guide roller 12 and two transport rollers 13 and 14 to the other reel 3. A cage-like member 16 is mounted in swivel-like fashion over that portion of the film extending along the bottom of the film magazine 1. A plurality of pressure rollers 15 are independently mounted in the cage-like member 16 and press the film 10 towards the bottom of the film magazine 1. Each pressure roller 15 is independently mounted on its own support member and is acted upon by a spring 17 which pushes the roller 15 toward the film 10. The cage-like member 16 is joined to an arm 20 by means of a swivel connection 18. The arm 20, in turn, is joined to the back wall of the film magazine by means of swivel connection 19. The entire cage-like member 16 can be swivelled upwardly away from the film 10 by turning the cage-like member 16 about one or both of the swivel connections 18 and 19.

The guide rollers 11 and 12 are respectively mounted in bearing supports 21 and 22. The transport roller 13 is mounted at one end in the bearing support 23 and at the other end in the back wall of the film magazine 1 which also acts as a bearing support. The other roller 14 is rotatably mounted adjacent to the transport roller 13 and includes biasing means (not illustrated) which urges roller 14 against roller 13. The supporting shaft 24 for transport roller 13 includes an axial shaft portion which extends exteriorly from the film magazine 1. A gear wheel 25 is tightly mounted on the exteriorly extending shaft portion.

The slide members 6 and 7 abut against each other in a light-tight manner at line 26. When the slide members 6 and 7 are moved away from each other in the direction of the arrows 27 and 28 by manually operating the hand grips 8 and 9, an opening in the bottom of the film magazine 1 is exposed.

The film magazine 1 is provided with ledge members 29 and 30 which serve to position the film magazine 1 firmly on top of the camera platform 31 illustrated by means of dotted lines in FIG. 1. Two rails 32 (also illustrated in dotted lines in FIG. 1) project from the top of camera platform 31. The rails 32 serve as guides for the film 10 when the latter is advanced while the slide members 6 and 7 are in their open position. The platform 31 is also provided with a central opening 33 which corresponds to the conventional shutter opening for cameras.

The film magazine of this invention operates in the following manner:

The film magazine 1 forms a completely separate and independent unit from the camera arrangement. The camera arrangement per se, which does not form an integral part of this invention, comprises the already described camera platform 31 which is provided with the opening 33. An objective lens (not illustrated) is mounted in said camera in axial alignment with the opening 33. The camera is further provided with electric motor driving means for advancing the film, a shutter mechanism, a projecting lamp, a camera table, various adjusting means for the camera, and other conventional camera attachments.

All of the forementioned parts are securely mounted in the overall arrangement and are only supposed to be replaced if they malfunction or are worn out. In contradistinction thereto, the film magazines of this invention are meant to be frequently exchanged.

A repeated exchange of film magazines can be easily accomplished with the film magazines forming part of this invention. The film 10 protrudes from the film magazine 1 after the slide members 6 and 7 have been opened due to the pressure exerted thereon by the springs 17 via the pressure rollers 15. The film 10 is prevented from bulging out and presenting a non-planar surface to light exposure by the camera platform 31. An uneven bulging of the film would occur because the independently acting pressure rollers 15 are under the influence of springs 17 of slightly unequal force, since it is practically impossible to install springs 17 of exactly the same force. It is, however, essential for a proper exposure of the film that the latter be held in as flat a plane as possible and normal to the light incidence. To obtain this object, the film magazine 1 is placed on the camera platform 31 of suitable construction. The camera platform 31 has a flat top surface and is provided with a pair of rails 32 extending longitudinally along each side of the opening 33. The film 10 is held firmly between the rollers 15 and rails 32 in a flat plane after the slide members 6 and 7 have been opened.

Should the slide members 6 and 7 be opened before the film magazine 1 is placed on top of the camera platform 31, the film 10 would bulge out in an uneven plane due to the unequal forces exerted thereon by the pressure rollers 15 as explained above. The film 10 only lies in the desired flat plane, substantially normal to the light incidence position, if the film magazine 1 is placed on top of the camera platform 31 and then slide members 6 and 7 are opened. The film 10 is then bulged out by the pressure rollers 15 so that it abuts against the pair of rails 32. It is, consequently, necessary for the camera and film magazine to act jointly and to form one unit in order for the film 10 to attain the desired position. In this connection it should be noted that the rails 32 are positioned on top of the camera platform 31 at an angle of 90 degrees with respect to the objective of the camera axis. In view thereof, a slight deviation of the film magazine 1 from the position illustrated in FIG. 1 does not affect the correct positioning of the film 10. Such a slight deviation of the film magazine 1 can occur if, for instance, dirt particles are accidentally lodged between the camera platform 31 and the underside of the film magazine 1. The pressure rollers 15, which are mounted independently from each other, exert pressure on the film 10 and urge it flatly against the pair of rails 32, regardless of the position of the film magazine 1 relative to the camera platform 31.

The film 10 is guided through the film magazine 1 as illustrated in FIG. 1 of the drawing. Prior to positioning the film magazine 1, the slide members 6 and 7 are closed. The film magazine 1 is placed with its underside on top of the camera platform 31 of the camera. Correct and fixed positioning is obtained by means of the ledge members 29 and 30. After the film magazine 1 has been correctly positioned on top of the camera platform 31, the gear wheel 25 meshes with a gear wheel of the film driving mechanism of the camera (not illustrated). The slide member 6 is then manually moved by means of handgrip 8 in the direction of arrow 27 and the slide member 7 is then moved manually by means of the handgrip 9 in the direction of arrow 28, which causes slide members 6 and 7 to separate at line 26 thereby forming an opening in the bottom of the film magazine 1 which overlies the opening 33 in the camera platform 31. Thereafter, the film 10 is bulged outwardly from the bottom of the film magazine 1 by means of the pressure rollers 15 which are acted upon by the springs 17. The film 10 is urged outwardly against the rails 32 of the camera platform 31, which forms part of a separate camera unit, and then lies flatly over the camera opening 33.

The film magazine 1 and camera are now in position for taking a picture. After the picture has been taken, the motor for the film driving mechanism is activated, which acts, via the gear wheel 25 and the shaft 24, on the interior film driving rollers 13 and 14, which causes the film 10 to advance in a known manner. The advance movement of the film 10 terminates after the motor is deactivated. During the advance movement of the film 10, the outer longitudinal edges of the underside of the film 10 glide over the rails 32 of the camera platform 31, whereas the upper side of the film 10 slides over the pressure rollers 15 thereby causing them to rotate.

The aforedescribed arrangement is suitable for taking single frame pictures and also taking successively a plurality of pictures.

In the event the film magazine 1 is to be exchanged with another similar magazine for taking pictures pertaining to a different subject matter or another department of the organization, it is only necessary to close the opening in bottom of the film magazine 1 by moving the slide members 6 and 7 towards each other by means of handgrips 8 and 9 until they meet at line 26. During this closing motion of slide members 6 and 7, the latter act on the underside of the film 10 and push the protruding portion of the film 10 against the action of the spring rollers 15 back into the interior of the film magazine. The film magazine is now closed in a light tight manner and can be removed from the camera and replaced by another film magazine.

The film magazine of this invention offers the following advantages:

By designing a novel construction in which the known film advance mechanism is shifted from the interior of the camera into a separate exchangeable film magazine, a film magazine has been invented by means of which it is possible to exchange a plurality of film magazines without any film wastage whatsoever. Photographic devices which have their film mounted directly inside the camera do not offer this important advantage. Even the known film magazines that are also mounted exteriorly of the camera proper, cannot be exchanged without film wastage unless the film is completely rewound.

The film in the film magazine is accurately positioned during the taking of pictures. The upper surface advantageously bears against the aforedescribed film pressure mechanism, whereas the underside of the film bears against the rails of the camera platform which forms part of the independent camera unit. This novel arrangement permits an easy exchange of film magazines without film wastage and also provides for an accurate positioning of the film with respect to the camera platform and the objective lens of the camera.

The film pressure mechanism comprises a plurality of spring actuated pressure rollers which are mounted parallel with respect to each other and independently from each other. This arrangement causes the film to be firmly held against the rails of the camera platform over the entire length of the camera opening. Furthermore, the film cannot be scratched during the advance motion of the film because the film is only lightly pressured by the film pressure mechanism and rolls easily over the pressure rollers. It should be noted, however, that the known film pressure mechanism of other cameras frequently causes scratching of the film.

The novel film magazine mechanism of this invention can be relatively cheaply produced because it is not necessary to maintain exact tolerances between the various parts forming the device. For instance, were the cage-like member 16 positioned slightly higher or lower than illustrated in FIG. 1, the net effect of this change on the positioning of the film would be negligible. The same would apply if the cage-like member were positioned slightly obliquely. The reason that an accurate mounting of the cage-like member 16 is not essential is due to the fact that the pressure rollers are independently mounted from each other.

The invention is not limited to the embodiment illustrated in the drawing. For instance, it is obviously possible to substitute the gear wheel 25 with other suitable coupling means. It is also possible to modify the film guide means inside the camera. Furthermore, the friction rollers which advance the film may be substituted with other known film driving means. The feature, important to the invention, resides in the film being driven inside the film magazine by driving means which are independent from the film reels. The driving of the film via one of the shafts of the film reels is already well known in the art. Another feature, important to the inventive concept, resides in the film, when a picture is being taken, protruding from the bottom of the film magazine and in lying in a plane substantially parallel thereto.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. An exchangeable film magazine, comprising in combination, a magazine having a bottom wall; two reels rotatably mounted in said magazine; said bottom wall having an opening adapted to be positioned in optical alignment with the shutter opening of a camera; film means mounted on a first one of said two reels, said film means running from said first reel over said opening to a second one of said two reels; slide means operatively mounted on said magazine covering said opening and adapted to selectively expose said opening and a portion of said film means by being moved, and a film pressure mechanism operatively mounted in said film magazine over said opening, said film pressure mechanism bearing against the portion of said film means lying opposite said opening and urging said portion outwardly through said opening when said slide means are positioned so as to expose said opening, thereby causing said film to protrude through said opening.

2. An exchangeable film magazine, comprising in combination, a magazine having a bottom wall; two reels rotatably mounted in said magazine; said bottom wall having an opening; said magazine being adapted to be placed on a camera platform having a pair of rails so that said opening of said magazine and said pair of rails are substantially optically aligned with the optical axis of said camera; film means mounted on a first one of said pair of reels and running from said first reel over said opening to a second one of said pair of reels; slide means operatively movably mounted on said bottom wall of said magazine and covering said opening and being adapted to selectively expose said opening and a preselected portion of said film means by being moved; and a film pressure mechanism operatively mounted in said film magazine over said openings; said film pressure mechanism bearing against that portion of said film means overlying said opening and urging said portion outwardly through said opening when said slide means expose said opening, thereby causing said film to protrude through said opening.

3. An exchangeable film magazine, comprising in combination, a magazine having an opening; two reels rotatably mounted in said magazine; said magazine being adapted to be placed on a camera associated therewith so that said opening is in optical alignment with the objective lens of said camera; a film mounted on a first one of said two reels and running over said opening to a second one of said two reels; a slide member slidably movably mounted on said magazine and selectively covering said opening, said slide member being manually movable and when moved outwardly exposing said opening, and a film pressure mechanism operatively mounted in said film magazine over said opening, said film pressure mechanism bearing against a substantial portion of said film which overlies said opening and thereby urging said portion outwardly through said opening when said slide member exposes said opening, thereby causing said film to protrude through said opening.

4. The exchangeable film magazine as set forth in claim 3, wherein said film pressure mechanism comprises a plurality of pressure rollers which bear against said overlying portion of said film, each pressure roller of said plurality of pressure rollers being independently suspended in said film pressure mechanism.

5. The exchangeable film magazine as set forth in claim 4, wherein each one of said independently suspended pressure rollers is spring biased toward said overlying portion of said film.

6. The exchangeable film magazine as set forth in claim 5, wherein each one of said independently suspended pressure rollers protrudes through said opening outside of said magazine when said slide member has been moved outwardly so that said opening is completely exposed.

7. The exchangeable film magazine as set forth in claim 3, wherein said film pressure mechanism comprises a cage-like supporting member swivelably mounted inside said magazine, and a plurality of spring-biased pressure rollers independently mounted in said cage-like supporting member.

8. The exchangeable film magazine as set forth in claim 1, including a transport roller rotatably mounted in said magazine adjacent to and underneath said second reel.

9. The exchangeable film magazine as set forth in claim 8, wherein said transport roller includes a shaft portion which axially projects exteriorly from said magazine; and a gear wheel axially secured on said shaft portion outside of said magazine.

References Cited

UNITED STATES PATENTS 1,612,860  1/1927  Fairchild.
2,492,418  12/1949  Furer _____ 352—223

FOREIGN PATENTS 533,035  11/1956  Canada.

NORTON ANSHER, *Primary Examiner.*

JOHN M. HORAN, *Examiner.*

JOSEPH F. PETERS, JR., *Assistant Examiner.*